Figure 1:

Dec. 30, 1958

J. E. VAN EPP 2,866,731

PROCESS OF COATING BUTYL RUBBER WITH NEOPRENE

Filed Jan. 27, 1955

INVENTOR
JAMES E. VAN EPP

BY
AGENT

United States Patent Office 2,866,731
Patented Dec. 30, 1958

2,866,731

PROCESS OF COATING BUTYL RUBBER WITH NEOPRENE

James E. Van Epp, Cornwall-on-Hudson, N. Y., assignor to E. I. du Pont de Nemours and Company, Wilmington, Del., a corporation of Delaware Application January 27, 1955, Serial No. 484,537

2 Claims. (Cl. 154—130)

This invention relates to cured elastomeric material and particularly to a cured elastomeric material which may be strongly adhered to itself and other surfaces, still more particularly to adhering a precured elastomeric material to a metal substrate and still more particularly to the lining of tanks, vessels and pipes with precured elastomeric material.

Natural and synthetic rubber lined metal tanks, vessels and pipes are employed for processing, storing and shipping corrosive chemicals. The normal procedure for lining such containers is to prepare the elastomeric lining material in sheet form, in the uncured state. The inside of the tank is primed with an organic solution of a material which adheres to both metal and the elastomeric material. The uncured elastomeric sheet and the dry primed surface are both coated with an adhesive solution, usually a solution of the same type of material as used for forming the lining, then after the adhesive is dry on both the lining material and the inside of the tank the two adhesive coated surfaces are brought together by means of a hand roller. After the lining material is in place the entire tank is heated to about 150° F. to 200° F. for 40 to 60 hours to cure the lining and adhesive layer. Depending upon the size and location of the tank, the lining is cured in situ by putting the entire tank in a heated enclosure, introducing low pressure steam inside the tank or filling it with hot water. The 40 to 60 hour curing cycle required in most cases is costly and time consuming.

Butyl rubber, chlorosulfonated polyethylene, polyurethane, copolymer of butadiene and acrylonitrile and natural rubber are most desirable materials for lining metal tanks due to their resistance to degradation when exposed to elevated temperatures and corrosive chemicals. Many attempts have been made to precure such elastomeric tank lining materials before lining the tank, thus avoiding the costly step of curing the lining material after it is adhered in place. The adhesives normally used for adhering the uncured elastomeric lining material to the inside of a metal tank will not adequately adhere the precured lining materials to a suitably primed metal surface.

It is a primary object of this invention to provide a precured chemically resistant elastomeric material which can be strongly adhered to itself or other surfaces. A further object is the provision of a process of lining metal tanks, vessels and pipes with an elastomeric lining which does not require curing after it is adhered to the inside of a metal tank. Other objects involve adhering a precured elastomeric sheet material to a variety of other surfaces such as wood, glass, ceramics, and textile fabrics including those formed from both natural and synthetic fibers.

These and other important objects will become readily apparent as the description of the invention proceeds.

The objects of this invention are accomplished by providing shaped and cured elastomeric compositions comprising butyl rubber, chlorosulfonated polyethylene, copolymer of butadiene and acrylonitrile, natural rubber or polyurethane with an adherent surface layer of neoprene on at least one side thereof, the neoprene surface having been applied to the shaped elastomeric material before curing. The preferred embodiment of the invention involves the preparation of elastomeric compounds based on Butyl rubber, chlorosulfonated polyethylene, copolymer of butadiene and acrylonitrile, natural rubber or polyurethane; the compounds containing sufficient curatives to cure the elastomer, sheeting the elastomeric compound, applying to at least one surface of the elastomeric sheet a neoprene compound containing insufficient curatives to cure the neoprene, and subjecting the surfaced elastomeric sheet to conditions which cure the elastomeric sheet and incompletely cure the neoprene surface. Other objects are accomplished by coating the neoprene surface on the cured elastomeric sheet and another surface with a neoprene adhesive composition containing a volatile solvent for the neoprene. After the adhesive composition has dried on both surfaces they are brought together with hand pressure.

Hereinafter the reference to "elastomeric sheet," "elastomeric material" or "elastomeric compound" refers to a composition which contains one or more of the following elastomers: Butyl rubber, chlorosulfonated polyethylene, copolymer of butadiene and acrylonitrile, natural rubber and polyurethane, as essential ingredients.

It is to be understood that the preferred embodiment of this invention involves the preparation of cured sheets of the elastomeric material having an uncured or incompletely cured surface layer of neoprene which may be adhered to other surfaces. While the strongest bonds between the cured elastomeric sheets and other surfaces are accomplished with the uncured or incompletely cured neoprene surface, considerable improvement can also be realized with a cured neoprene-surface. It is essential that the neoprene surface, whether uncured, incompletely cured or cured, be applied to the elastomeric material in the uncured state before curing the elastomeric material.

By the term "incompletely cured neoprene compound" is meant one which is soluble in certain aromatic solvents, such as, e. g., toluene, benzene or xylene, or is markedly swollen by said solvents. By the term "cured neoprene compound" is meant one which is substantially insoluble and which has minimum swelling in said solvents.

Figure 2:
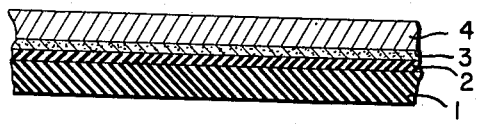
Figure 3:
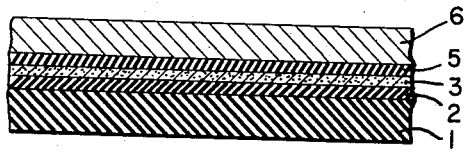
Figure 4:
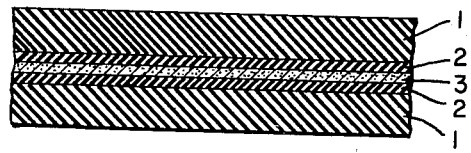

Referring to the drawing: Figure 1 is a cross-section illustration of a cured elastomeric material 1 with an adherent neoprene surface layer 2. Figure 2 is a cross-section illustration of another surface 4 adhered to the neoprene surface 2 of the precured elastomer sheet 1 by means of an intermediate adhesive 3. Figure 3 is a cross-section illustration showing adherent layers arranged in the following order: precured elastomeric sheet 1, neoprene surface 2, intermediate adhesive 3, metal primer 5, and metal substrate 6. Figure 4 is a cross-section illustration of the product illustrated in Figure 1 adhered to itself by means of an intermediate adhesive layer 3.

The following examples illustrate various preferred embodiments of the invention wherein the parts and percentage figures are expressed as a weight basis unless stated otherwise.

EXAMPLE I

The following ingredients were thoroughly mixed on a two roll rubber mill in a manner well-known to those skilled in the rubber art.

*Calendered elastomer film*

| | Parts by wt. |
|---|---|
| Butyl rubber (copolymer of 98 parts of isobutylene and 2 parts of isoprene) | 100.0 |
| Polyac (25% polyparadinitrosobenzene, 75% inert material) | 0.5 |
| Stearic acid | 0.5 |
| Carbon black pigment | 50.0 |
| Clay | 100.0 |
| Zinc oxide | 5.0 |
| Circo oil (mixture of pure petroleum hydrocarbon) | 15.0 |
| Tetramethyl thiuram disulfide | 1.0 |
| Benzothiazyl disulfide | 1.0 |
| Sulfur | 2.0 |
| | 275.0 |

During mixing the rolls on the mill were water cooled to prevent scorching or premature curing of the mixed compound. After the above ingredients were thoroughly mixed the mass was calendered to 75 mils thickness, then the calendered film was top coated on one side with two doctor knife applications of the following solution composition:

*Top coat for calendered film*

| | Parts by Wt. | |
|---|---|---|
| | Pounds | Ounces |
| Neoprene | 25 | |
| Tetraethyl Thiuram Disulfide | | 0.5 |
| Barytes | 3 | 12.0 |
| Magnesium Oxide | 2 | 8.0 |
| Clay | 3 | 12.0 |
| Circo Oil (Mixture of pure petroleum hydrocarbons) | | 8.0 |
| Diphenylguanidine | | 6.5 |
| Phenyl-beta-naphthylamine | | 6.5 |
| | 36 | 5.5 |

The above composition was prepared in the well-known manner by mill mixing all the ingredients, then dispersing the mixed ingredients in toluol to form a 33% solution.

Sufficient of the solution composition was applied by the two coats to one side of the calendered film to deposit about 1.5 ounces per sq. yd. of the non-volatile ingredients. The coated film was passed through a heat zone on a carrier to evaporate the toluol. The top coated calendered film was batched up in roll form with Holland cloth interwound on a curing drum and then subjected to a temperature of 260° F. for 8 hours to cure the film. The above top coat composition contains insufficient curatives to completely cure the neoprene top coating composition under conditions which will completely cure the Butyl rubber compound. The cured coated calendered film represents an article of commerce and is supplied to fabricators for adhering to metals and other surfaces.

The following examples illustrate other elastomeric compounds for forming into sheets by calendering and coating on at least one side with the above neoprene top coating composition prior to curing the calendered film.

EXAMPLE II

| | Parts by wt. |
|---|---|
| Chlorosulfonated polyethylene | 100.0 |
| "Staybelite resin" (hydrogenated rosin) | 2.5 |
| Carbon black | 54.0 |
| Litharge | 20.0 |
| Dipentamethylene thiuram tetrasulfide | 1.0 |
| | 177.5 |

EXAMPLE III

| | Parts by wt. |
|---|---|
| Hycar OR-25 (copolymer of 65 parts butadiene and 35 parts acrylonitrile) | 100.0 |
| Carbon black | 54.0 |
| Stearic acid | 1.0 |
| Zinc oxide | 5.0 |
| Sulfur | 1.5 |
| Benzothiazyl disulfide | 1.5 |
| | 163.0 |

EXAMPLE IV

| | Parts by wt. |
|---|---|
| Polyurethane (reaction product of polytetramethylene-ether glycol and toluene diisocyanate) | 100.0 |
| Toluene diisocyanate urea | 5.0 |
| | 105.0 |

EXAMPLE V

| | Parts by wt. |
|---|---|
| Natural rubber (smoked sheet) | 173.4 |
| RPA#2 (⅓ naphthyl beta mercaptan and ⅔ inert hydrocarbon) | 1.6 |
| Mineral rubber—hard hydrocarbon | 17.5 |
| Carbon black | 113.75 |
| Stearic acid | 1.75 |
| Zinc oxide | 8.75 |
| Phenyl beta naphthylamine | 1.75 |
| Mercaptobenzothiazole | .88 |
| Benzothiazyl disulfide | .87 |
| Sulfur | 5.25 |
| | 325.50 |

The compounds described above, Examples II to V, were thoroughly mixed on a two roll mill and then calendered to a film thickness of 75 mils followed by top coating each film with the same neoprene top coating composition and cured in the same manner as described in Example I.

The cured elastomeric films with the incompletely cured neoprene top coats, Examples I to III, together with controls of the cured films without the neoprene top coat were adhered to an iron surface which had been previously primed with a 20% solution of chlorinated rubber in toluol in the following manner.

The iron surface was thoroughly cleaned by sanding, followed by washing with a hydrocarbon solvent. The cleaned iron surface was then prime coated with a 20% solution of chlorinated rubber in toluol and allowed to dry. The primed surface was then coated with the following intermediate neoprene adhesive composition and allowed to dry.

*Intermediate neoprene adhesive composition*

| | Parts by wt. |
|---|---|
| Neoprene top coating composition of Example I | 100.0 |
| Zinc oxide | .75 |
| Litharge | 3.0 |
| Butyraldehyde mono butyl amine condensation product | .75 |
| | 104.5 |

The above intermediate neoprene adhesive composition is the same as the neoprene top coating composition, described above in Example I, plus the addition of the activators immediately prior to application.

The cured elastomeric sheets with the adherent surface layer of incompletely cured neoprene, Examples I to III, were washed lightly with toluol to remove possible surface contamination and allowed to dry and then coated with the same intermediate neoprene adhesive composition as applied to the primed metal surface. The toluol wash may be omitted if the surfaces are relatively fresh and clean. The intermediate neoprene adhesive coated metal surface and the intermediate neoprene adhesive coated precured elastomeric surfaces were brought together and rolled with a hand roller and allowed to age at room temperature for about three weeks before testing bond strength.

As a control for each example the laminated assemblies described above were repeated with the same precured elastomeric sheets without the incompletely cured neoprene top coat and allowed to age at room temperature for a like period before testing bond strength.

The precured elastomeric sheets of Examples I to V with the incompletely cured neoprene top coat surface were adhered to themselves by means of the intermediate neoprene adhesive layer as illustrated in Figure 4 of the drawing in which case the intermediate neoprene adhesive layer was applied to the incompletely cured neoprene top coat surface and after drying was doubled upon itself, followed by hand rolling to press the adhesive coated surfaces together. The assemblies were allowed to age at room temperature for about 3 weeks before testing bond strength. As controls, for adhering precured elastomeric sheets to themselves, assemblies were prepared differing from the above in that the incompletely cured neoprene top coat was omitted on each precured elastomeric sheet, and allowed to age at room temperature for about 3 weeks before testing bond strength.

The bond strengths for the precured elastomeric sheets top coated with incompletely cured neoprene adhered to the primed metal surface and to themselves by means of an intermediate neoprene adhesive layer, together with the bond strengths for the controls which omitted the incompletely cured neoprene layer were as follows:

TABLE I

[Adhesion—pounds pull per 1 inch strip to separate laminated layers.]

|  | Precured Elastomeric Sheet To Primed Metal | Precured Elastomeric Sheet To Itself |
| --- | --- | --- |
| Example I | 11.4 | 14.5 |
| Control | 3.9 | 3.8 |
| Example II | 21.5 | 22.5 |
| Control | 7.6 | 2.8 |
| Example III | 16.5 | 23.3 |
| Control | 6.8 | 13.8 |
| Example IV |  | 23.0 |
| Control |  | 7.8 |
| Example V |  | 8.9 |
| Control |  | 4.5 |

The adhesion test was carried out in accordance with the procedure described in Method 5960 of Federal Specification CCC–T–191b dated May 15, 1951, for Textile Test Methods, using a strip 1" wide.

The uncured intermediate neoprene adhesive composition, which contains sufficient curatives and accelerators to cure the neoprene, may be applied directly upon any one of the uncured elastometric compounds described in Examples I to V, and then drying and curing both the elastomer and neoprene. The cured neoprene surface may then be adhered to itself, metals and other surfaces mentioned above, by applying the intermediate neoprene adhesive composition to the cured neoprene surface and the other surface to be adhered. After the two surfaces are dry they are brought together by hand pressure in the same manner as described above. When the neoprene surface on the cured elastomeric sheet is cured, the adhesion to other surfaces by means of the intermediate neoprene adhesive composition is about doubled over that obtained if the cured neoprene surface is omitted, whereas it is tripled or quadrupled and in some cases increased eight fold if the neoprene surface is incompletely cured or uncured.

The precured elastomeric materials with cured, uncured or incompletely cured neoprene surface may be adhered to other metals by means of the intermediate neoprene adhesive layer such as, for example, aluminum, zinc, tin or brass, as well as wood, paper, textile fabrics made from both natural and synthetic fibers, and various plastics to which the neoprene surface layer can be adhered directly through various intermediate layers. Such composites include adhering any one of the precured elastomeric sheets with the incompletely cured, uncured or cured neoprene surface to any other member of the group of precured elastomeric materials of this invention having an incompletely cured, uncured, or cured neoprene surface.

A primary use of the product of this invention is the lining of metal tanks for processing, storing and transporting corrosive chemicals. A metal tank was lined with the precured Butyl rubber sheet of Example I having an incompletely cured neoprene surface coat in the following manner.

After the inside of the tank was cleaned by sandblasting and washing with hydrocarbon solvent and dried, it was coated with a 20% solution of chlorinated rubber in toluol to prime the surface. About 1.0 ounce of dry chlorinated rubber per square yard was applied. After allowing the primer to dry, two coats of the intermediate neoprene adhesive composition described above were applied to the primed surface and dried after each coat. A total of about 3.0 to 4.0 ounces per square yard of dry adhesive coating was applied in the two coats. After cutting into sheets of suitable size, the neoprene coated side of the elastomeric film was coated with one coat of the intermediate neoprene adhesive composition and dried. The coated surfaces were brought together by means of a hand roller. The tank was completely lined by repeating the above operation several times, the various sheets of precured film being juxtaposed.

The area adjacent to the butted edges of the tank lining was covered with a narrow strip of the precured Butyl rubber sheet with the incompletely cured neoprene surface coat as described in Example I, in accordance with the following procedure. The exposed area adjacent to the butted edges of the various sheets not having the incompletely cured neoprene layer and the incompletely cured neoprene surface of the seam covering strip were washed lightly with toluol and allowed to dry.

These dried surfaces were coated with the following adhesive composition:

*Seam sealing adhesive*

|  | Parts by wt. |
| --- | --- |
| Hycar 2202 (brominated Butyl rubber) | 100.0 |
| Zinc oxide | 5.0 |
| Carbon black | 50.0 |
| Stearic acid | .5 |
| Tetramethyl thiuram disulfide | 1.0 |
| Benzothiazyl disulfide | 1.0 |
| Sulfur | 2.0 |
|  | 159.5 |

The above ingredients were mill mixed and then dissolved in toluol to form a 20% solution. The seam sealing cement was applied to the toluol washed surfaces and allowed to dry and then the surfaces were pressed together by means of a hand roller.

For forming lapped seams of the precured tank lining material the precured elastomeric sheet material is provided with the incompletely cured neoprene layer on both sides. The lapped portions of the lining material are wetted with toluol and allowed to dry. The toluol treated surfaces are then coated with the intermediate neoprene adhesive composition and allowed to dry. The lapped portions of the lining material are then rolled with a hand roller.

In addition to the lining of tanks, this invention is also useful in lining pipes, drums and various processing vessels and kettles.

Throughout the specifications and appended claims: The term "copolymer of butadiene and acrylonitrile"

embraces the material of the type disclosed in U. S. Patent 1,973,000 and compositions which contain the copolymer as an essential ingredient.

The term "chlorosulfonated polyethylene" denotes the material of the type disclosed in U. S. Patent 2,212,786 and compositions which contain the chlorosulfonated polyethylene as an essential ingredient.

The term "polyurethane" denotes a polymeric elastomer obtained by reactions involving a polyalkyleneether glycol having a molecular weight of at least 750, an organic diisocyanate and a chain-extending compound containing active hydrogen atoms, such as, e. g., water, hydrogen sulfide, or an organic compound containing active hydrogen atoms attached to two different atoms in the molecule, such as the polymeric elastomers described in copending application Serial No. 365,270; filed June 30, 1953, by F. B. Hill, Jr., and compositions which contain the polyurethane as an essential ingredient.

By the term "Butyl rubber" is meant copolymers of 99-85 parts isobutylene and 1 to 15 parts of isoprene and compositions which contain the Butyl rubber as an essential ingredient.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The invention claimed is:

1. Process of preparing an unsupported cured film of Butyl rubber characterized by its ability to be strongly bonded to other surfaces which comprises forming a compound comprising uncured Butyl rubber as an essential ingredient and curatives to cure said Butyl rubber, shaping said compound into a base film, applying as a surface layer to at least one side of said base film a compound comprising uncured neoprene and being free of curatives which would completely cure said neoprene, heating said composite structure to cure the Butyl rubber in said base film whereby the neoprene in said surface layer is incompletely cured.

2. Process of adhering precured Butyl rubber to a metal substrate which comprises preparing a compound comprising uncured Butyl rubber as an essential ingredient and curatives to cure the Butyl rubber, shaping said compound into the form of a base film, preparing a second compound comprising neoprene as an essential ingredient and being free of curatives which would completely cure said neoprene, applying a layer of said second compound to at least one surface of said base film, heating said surfaced base film to effect a complete cure of the Butyl rubber in said base film whereby the neoprene in said surface layer is incompletely cured, applying a coating of a solution of a chlorinated rubber in a volatile solvent to a metal substrate, evaporating the solvent from said chlorinated rubber coating, applying a solution of a neoprene compound to said chlorinated rubber coating and the incompletely cured neoprene surface layer on the cured Butyl rubber base film and evaporating the solvent therefrom and pressing said neoprene coated surfaces together.

References Cited in the file of this patent

UNITED STATES PATENTS

| | | |
|---|---|---|
| 2,227,991 | Winkelmann et al. | Jan. 7, 1941 |
| 2,262,092 | Buffington | Nov. 11, 1941 |
| 2,351,735 | Bake | June 20, 1944 |
| 2,352,637 | Juve | July 4, 1944 |
| 2,418,025 | Garvey | Mar. 25, 1947 |
| 2,451,911 | Braden | Oct. 19, 1948 |
| 2,471,905 | Smith | May 31, 1949 |
| 2,541,550 | Sarbach et al. | Feb. 13, 1951 |
| 2,581,920 | Kuhn | Jan. 8, 1952 |
| 2,749,960 | Schwartz | June 12, 1956 |

FOREIGN PATENTS

| | | |
|---|---|---|
| 493,139 | Great Britain | Oct. 3, 1938 |